(12) United States Patent
McClure

(10) Patent No.: US 9,970,468 B2
(45) Date of Patent: May 15, 2018

(54) BIASED BLIND SIDE TEMPORARY FASTENERS, SYSTEMS AND METHODS

(75) Inventor: Travis D. McClure, Kirkland, WA (US)

(73) Assignee: Centrix, Inc., Kent, WA (US)

( * ) Notice: Subject to any disclaimer, the term of this patent is extended or adjusted under 35 U.S.C. 154(b) by 0 days. days.

(21) Appl. No.: 13/273,197

(22) Filed: Oct. 13, 2011

(65) Prior Publication Data
US 2013/0084130 A1    Apr. 4, 2013

Related U.S. Application Data

(63) Continuation-in-part of application No. PCT/US2010/001098, filed on Apr. 13, 2010.

(60) Provisional application No. 61/212,632, filed on Apr. 13, 2009.

(51) Int. Cl.
F16B 19/10    (2006.01)

(52) U.S. Cl.
CPC ......... *F16B 19/109* (2013.01); *Y10T 403/602* (2015.01)

(58) Field of Classification Search
USPC ........ 411/347, 57.1, 54, 54.1; 403/325, 326, 403/327, 408.1
See application file for complete search history.

(56) References Cited

U.S. PATENT DOCUMENTS 1,978,935 A    10/1934  Douglas
2,317,315 A *  4/1943   Wallace ............... 24/453
2,365,787 A * 12/1944   Wallace ............... 269/48.4
2,370,336 A    2/1945   Wallace
2,379,786 A    7/1945   Bugg et al.
2,439,531 A *  4/1948   Wallace ............... 269/48.4
(Continued)

FOREIGN PATENT DOCUMENTS

EP    1083341 A1    3/2001
FR     964157 A     8/1950
(Continued)

OTHER PUBLICATIONS

ISA Korean Intellectual Property Office, International Search Report Issued in Application No. PCT/US2010/001098, dated Jan. 25, 2011, WIPO, 4 pages.
(Continued)

*Primary Examiner* — Michael P Ferguson
(74) *Attorney, Agent, or Firm* — McCoy Russell LLP

(57) ABSTRACT

Biased blind side fasteners and related methods for temporarily securing together at least two work pieces that each define a hole through which at least a portion of the fastener may pass. Fastener embodiments include an elongate, hollow case for substantially housing a generally cylindrical collet body and a bias element for urging the collet body into the case, and at least partially housing a central rod having a proximal end linked to a proximal portion of the case by a web element and a distal end extending from the case. Such embodiments further include a translatable plunger for temporarily overcoming the urging of the bias element and causing extension of the collet body away from the case, thereby permitting insertion of a fastener into the work pieces' holes, wherein the plunger is formed to substantially translatably pass through the web element.

11 Claims, 8 Drawing Sheets

(56) References Cited

U.S. PATENT DOCUMENTS

| | | | |
|---|---|---|---|
| 2,649,884 | A | 8/1953 | Westover |
| 2,775,155 | A | 12/1956 | Tompkins et al. |
| 2,936,015 | A | 5/1960 | Rapata |
| 2,994,242 | A | 8/1961 | Buff et al. |
| 3,000,086 | A * | 9/1961 | Davis .......................... 269/48.4 |
| 3,469,493 | A | 9/1969 | Fisher |
| 4,537,542 | A | 8/1985 | Pratt et al. |
| 5,065,490 | A | 11/1991 | Wivagg et al. |
| 5,240,361 | A * | 8/1993 | Armstrong et al. .......... 411/347 |
| 5,704,752 | A | 1/1998 | Logerot |
| 5,927,919 | A * | 7/1999 | Blankenship et al. .......... 411/64 |
| 6,179,539 | B1 | 1/2001 | Benoit et al. |
| 6,287,044 | B1 | 9/2001 | Huber |
| 7,179,037 | B2 | 2/2007 | Aukzemas et al. |
| 2004/0081529 | A1 | 4/2004 | Stanton et al. |
| 2005/0123372 | A1 | 6/2005 | Sato |
| 2005/0169726 | A1 | 8/2005 | McClure |

FOREIGN PATENT DOCUMENTS

| | | |
|---|---|---|
| GB | 413403 A | 7/1934 |
| GB | 1548964 A | 7/1979 |
| JP | H1151018 A | 2/1999 |
| JP | 2005517876 A | 6/2005 |
| JP | 2010522311 A | 7/2010 |
| WO | 03069971 A2 | 8/2003 |
| WO | 2008118420 A2 | 10/2008 |

OTHER PUBLICATIONS

ISA Korean Intellectual Property Office, Written Opinion Issued in Application No. PCT/US2010/001098, dated Jan. 25, 2011, WIPO, 3 pages.
European Patent Office, Extended European Search Report Issued in Application No. 10778030.6, dated Apr. 5, 2013, Germany, 6 pages.
State Intellectual Property Office of the People's Republic of China, Office Action Issued in Application No. 201080025690.6, dated Apr. 27, 2013, 8 pages.
Japan Patent Office, Office Action Issued in Application No. 2012-505881, dated Jan. 7, 2014, 4 pages. (Submitted with Machine Translation).
State Intellectual Property Office of the People's Republic of China, Office Action Issued in Application No. 201080025690.6, dated Apr. 1, 2014, 7 pages.
Japan Patent Office, Notice of Allowance Issued in Application No. 2012-505881, dated Oct. 7, 2014, 6 pages. (Submitted with Machine Translation).
State Intellectual Property Office of the People's Republic of China, Notice of Allowance Issued in Application No. 201080025690.6, dated Feb. 4, 2015, 3 pages.

* cited by examiner

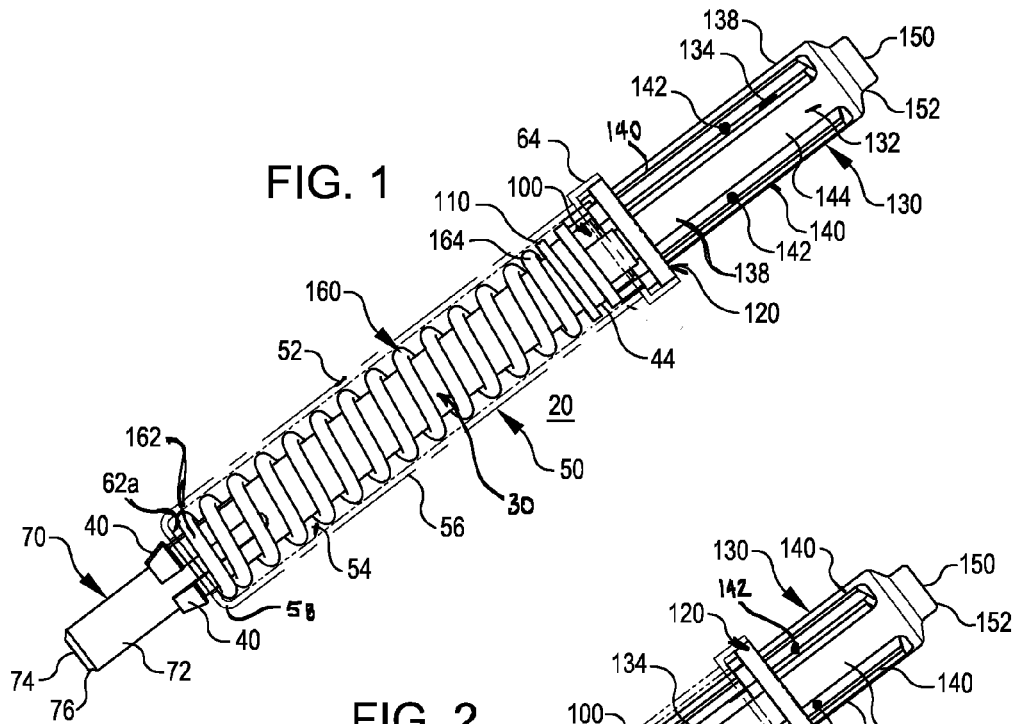
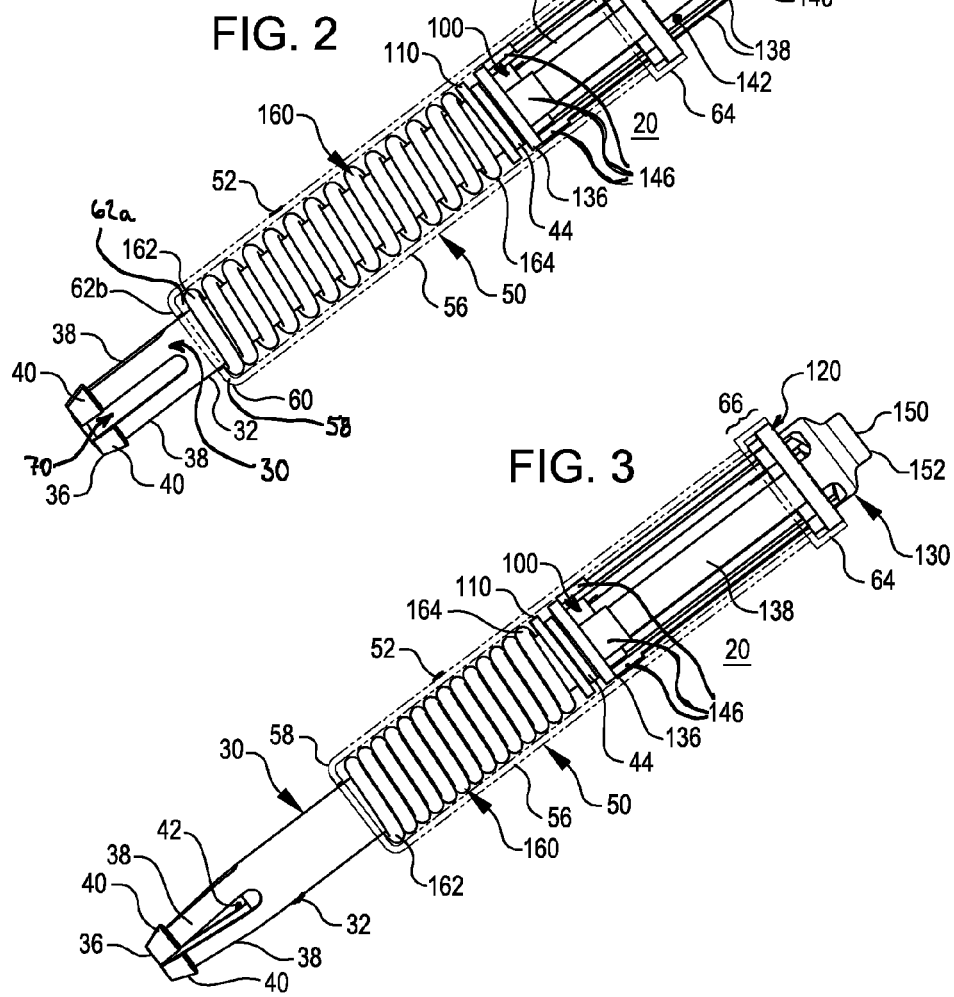

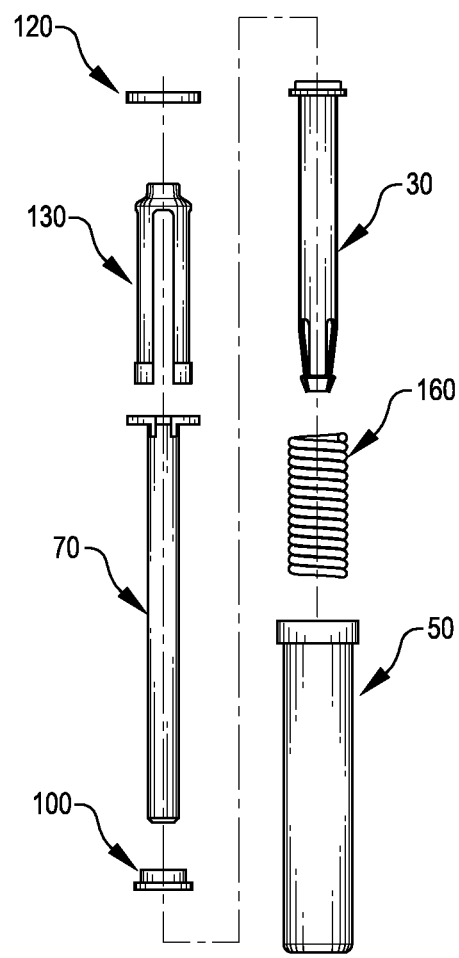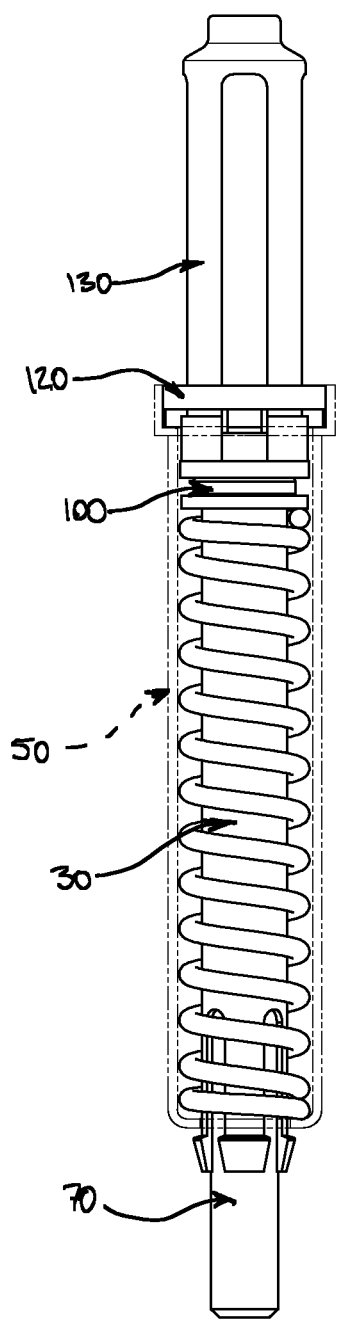

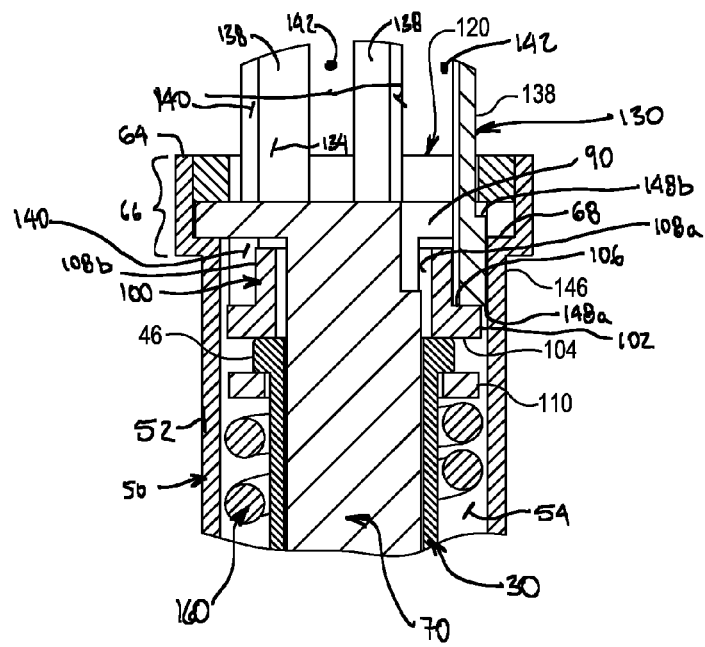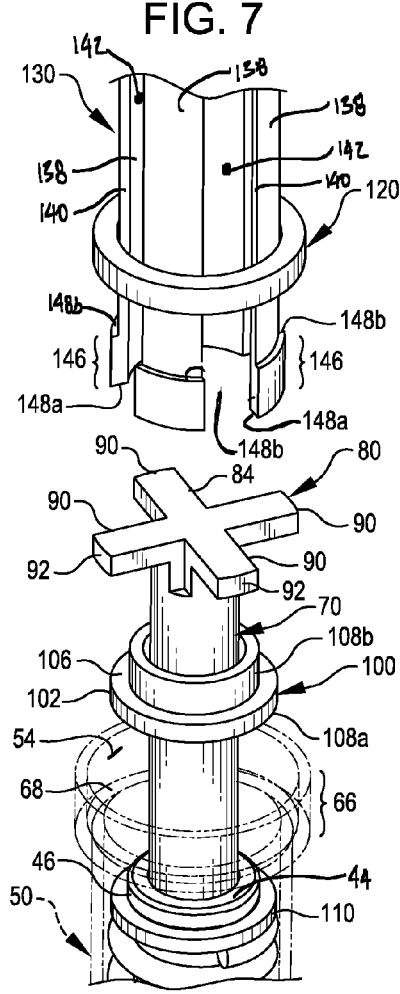

FIG. 11
FIG. 12
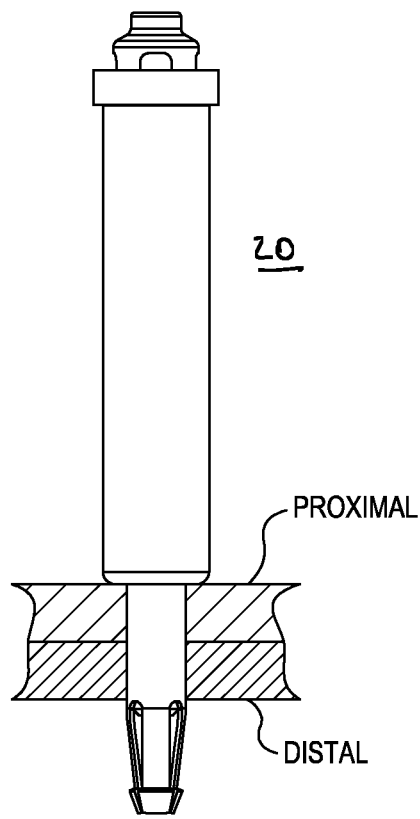
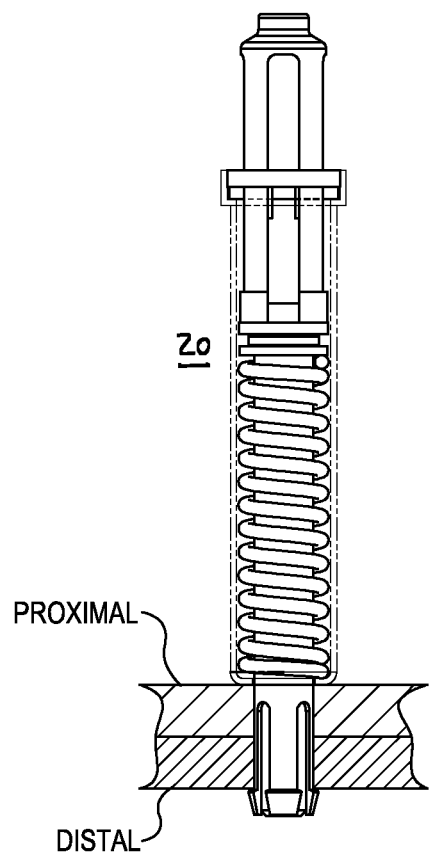
FIG. 13
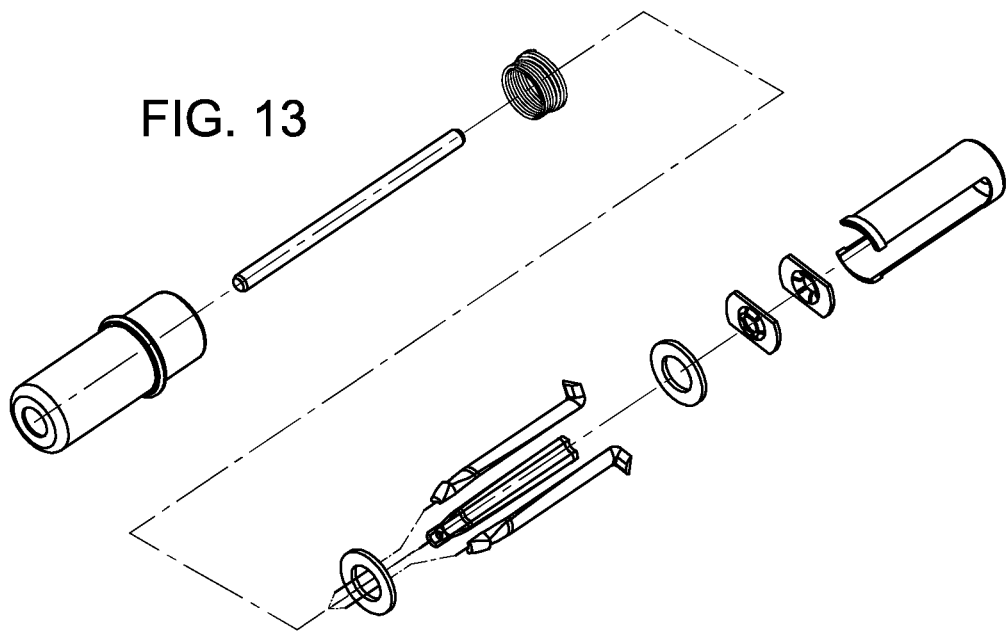

BIASED BLIND SIDE TEMPORARY FASTENERS, SYSTEMS AND METHODS

BACKGROUND OF THE INVENTION

Biased blind side temporary fasteners are used primarily to hold at least one work piece, commonly a panel-type material, in registry with another work piece, each defining at least one commonly aligned hole through which the fastener may at least partially pass. Once the two or more work pieces are so aligned and retained, they may be subject to subsequent material processing, e.g., welding, permanent fastening, etc. Examples of environments wherein such fasteners are commonly used include the aerospace and automotive industries.

A common form of such fasteners is the "CLECO" fastener, an example of which can be found in U.S. Pat. No. 4,537,542. In such fasteners, a static central projection anchored to opposing wall portions of the fastener case separates a pair of legs that axially translate about the projection in the working region of the fastener. Depressing a plunger causes the legs to translate along the projection until the distal ends thereof clear the projection, thereby permitting those portions of the legs to collapse toward each other, effectively modifying the external diameter of the distal ends. A spring interfaces with the plunger and the case to resist the plunger depression; the legs are linked to the plunger and therefore assume a clamped state as a nominal state when the spring is permitted to fully extend within the limits of its enclosure.

While this style of fastener may be adequate in certain situations, e.g., low tolerance material processing, the legs are at best only partially hemispherical, which fails to address issues of lateral play between the work pieces when compressively held together by the fastener. Moreover, such fasteners are more likely to react negatively to work piece rotation given the inclusion of three or more elements that are not mechanically linked to each other (there is intentional "float" between all components to permit translation of the legs relative to the projection, but this float is subject to very little restraint in the plane of the projection).

SUMMARY OF THE INVENTION

The invention is directed to biased blind side fasteners for temporarily securing together at least two work pieces that each define an aperture, bore, hole or orifice (hereinafter collectively "hole" unless otherwise specified) through which at least a portion of the fastener may pass. The invention is also directed to methods for making and using fastener embodiments. Use of fastener embodiments of the invention enable the temporary yet secure association of at least two work pieces wherein a bias element within the fastener causes a clamping force to form between the distal portions or ends of two elements of the fastener, each of which compressively engages with a work piece.

A first series of fastener embodiments according to the invention comprises an elongate, hollow case for substantially housing a generally cylindrical collet body and a bias means, and at least partially housing a central rod having a proximal end linked to a proximal portion of the case by a web element, and further comprises a plunger for temporarily overcoming an inherent clamping bias, thus allowing for the insertion of a fastener into the work pieces' holes, wherein the plunger is formed to substantially translatably pass through the web element. Through use of a generally cylindrical collet body, a high level of work piece alignment keyed from the holes or orifices can be achieved, in many instances resulting in a total clearance between the collet body of the fastener and the work piece hole or orifice of less than 0.001" in any radial direction.

A second series of fastener embodiments according to the invention comprises an elongate, hollow case for substantially housing a plurality of clamping legs and a bias means, and at least partially housing a central rod having a proximal end linked to a proximal portion of the case by a web element, and further comprises a plunger for temporarily overcoming an inherent clamping bias, thus allowing for the insertion of a fastener into the work pieces' holes, wherein the plunger is formed to substantially translatably pass through the web element.

The collet body of the first series of fastener embodiments of the invention is similar in construction and function to those disclosed in WO 03/069971 (application number PCT/US03/02925), the disclosure of which is incorporated herein. In summary, a collet body according to the fastener embodiments of the invention includes an axis and comprises an outer surface defining an outer diameter, an inner surface defining an inner diameter, a distal portion having a distal end defining a first opening and a proximal portion having a proximal end defining a second opening, wherein the distal portion comprises a plurality of flexible fingers, distal portions of which constitute the collet body distal end and at least partially define the first opening, and further comprise gripping portions extending radially from the outer surface thereof.

With respect to the plurality of flexible fingers, many invention embodiments have fingers with a radially converging bias, whereby the distal portions of the fingers radially converge to establish a reduced inner surface diameter at the collet body distal end (a tapered form). As will be described in more detail below, this reduced inner surface diameter is less than the outer surface diameter of a central rod.

The collet body gripping portions referenced earlier include a leading face and a trailing face, the latter of which constitutes a reactive surface for compressively contacting the face of a work piece and are substantially orthogonal to the collet body axis. The convergence of each leading face and trailing face defines a peripheral edge or portion that represents the maximum diameter of the collet body thereat when considered in view of any other gripping portions and when the collet body is in a generally (non-tapered) cylindrical form.

It should be noted that when the collet body fingers are in a radially converged state, the maximum external surface diameter at its gripping portions is less than any diameter of a working portion of the collet body (as used herein, the working portion of the collet body is that portion of the collet body that may reside or outside the case during operation of a fastener embodiment, i.e., the stoke of the collet body). By establishing this limit to the external surface diameter, the distal end of the collet body will be able to traverse each work piece hole in order for the gripping portions to reach an opposing work piece reactive surface. As will be described in more detail below, this limitation also facilitates fabrication of certain invention embodiments.

The generally cylindrical case functions as a housing for at least part of all elements comprising the fastener embodiments of the invention, and primarily encompasses the bias means and most of the collet body during a nominal state. The case includes an outer surface defining an outer diameter, an inner surface defining an inner diameter of sufficient dimension to accept the collet body, a distal end defining a first opening and a proximal end defining a second opening, the two ends being separated by a body portion.

In addition to providing translational guidance for certain embodiment elements as will be described in more detail below with respect to selected fastener embodiments, the case directly or indirectly provides both a work piece reactive surface and retention means in the form of an inner surface reduced diameter portion at the distal end thereof. In the case of the former, the distal end outer surface functions as a reactive surface when abutted against a work piece during use of fastener embodiments; in the case of the latter, the minimum inner surface diameter at or proximate to the distal end (the reduced inner diameter portion) is sized to permit translation of at least the working portion of the collet body there through, but preferably not so great so as to permit translation of the gripping portion of the collet body distal end there through when the same is in a non-tapered or expanded state.

The rod functions as a guide for reciprocal motion of the collet body, and a structure to radially outwardly displace the collet body fingers while the device is in an operative or nominal state. The rod includes an outer surface and comprises a distal end and a proximal end separated by a body portion. Like the prior art, the rod remains substantially axially stationary during operation of the various device embodiments of the invention. However, with respect to the first series of fastener embodiments, it accommodates a fully cylindrical means for engaging a distal or blind work piece by anchoring its proximal end to a proximal portion of the case. In this manner, the collet body, which wholly surrounds the rod, is free to reciprocate from the proximal end of the rod to the distal end of the rod, although when assembled, the case functionally limits the extent of such reciprocation.

The bias means, which is often times a compression spring, is held substantially within the confines of the case and engages the case and the collet body. In many embodiments, the bias means reacts against the reduced diameter portion of the case at a first end and an increased diameter portion at the proximal end of the collet body. As a consequence of this arrangement, movement of the collet body distal end towards the case reduced diameter portion is resisted by the bias meas. This resistance is elastic in nature and creates a restorative force between the collet body distal end and the case reduced diameter portion when the collet body is displaced from its nominal position.

In a nominal state, there is preferably at least some bias present between the case (which acts as a mechanical ground) and the collet body such that the collet body distal end is in compression with the distal end of the case. In this manner, even exceptionally thin work pieces can be subjected to the clamping effect of the fastener. Preferably, substantially all of the bias means force is present in this nominal state.

The plunger is the element responsible for imparting translation to the collet body when its compression force exceeds the bias of the bias means. Thus, when the restorative force of the bias means is overcome by the compression force imparted by the plunger, the distal end of the collet body is caused to translate towards distal end of the rod. Depending upon the length of the rod exposed to the environment, the distal end of the collet body will at some point translate past the distal end of the rod, thereby permitting a radial constriction bias in the collet body fingers to radially converge the fingers. In this state, the maximum diameter of the collet body at the gripping elements is equal to or less than the outer diameter of the collet body at its working portion. Those persons skilled in the art will of course appreciate that even if the fingers are not fully collapsed, an insertion force presented against the gripping elements leading face, which are acute to the collet body axis, will impart an additional radial convergence force, thereby causing further radial convergence and functionally achieving the desired diameter reducing effect.

Because the bias means must be between the case and the collet body, and because the plunger must act, directly or indirectly, upon the collet body, a way must exist for the plunger to act on the collet body while still permitting the rod to be linked to the mechanical ground of the case in order to be substantially axially static. Embodiments of the invention provide a solution by including a web element at the proximal portion of the rod and the proximal portion of the case. The web element includes a plurality of openings through which conforming fingers of the plunger may pass. Thus, plungers according to the invention comprise an outer surface defining an outer diameter, an inner surface defining an inner diameter, a distal portion having a distal end defining a first opening and a proximal portion having a proximal end comprising a head portion, wherein the distal portion comprises a plurality of fingers, distal portions of which at least partially define the first opening and lateral faces of which define a plurality of slots, two each being circumferentially adjacent to each finger. The lateral faces are preferably spaced from each other a distance no greater than the distance between corresponding structure in the web element, thus permitting the fingers to axially translate within the confines of the web openings.

The web element may be part of either the case or the rod, or may be a discrete component introduced during assembly of a fastener according to these features of the invention. Preferably, the web element comprises a plurality of radially aligned arms like spokes on a wheel where the hub is the rod and the wheel is the case inner surface. By having a discontinuous periphery, i.e., the case inner surface is exposed within the arc sections, the plunger outer surface diameter can closely match that of the case inner surface diameter, and benefit from a close fit relationship there with as described below, and can further better engage the collet body. In any event, the web element is at least temporarily fixedly attached to both the case and the rod.

To prevent unintended egress of the plunger fingers, many invention embodiments have fingers that comprise a radially extending flange that interferes with a locking ring or washer inserted at the web element after insertion of the plunger fingers. This locking ring or washer may then serve two purposes: to prevent egress of the plunger finger distal ends from inside the case via the web element openings, and prevent egress of the web element (and therefore also the rod) from inside the case.

Because the stroke of the plunger is proportional to the stroke of the collet body, the stroke can be substantial in comparison to the plunger outer diameter. Recalling that the plunger does not begin to envelope the rod until that portion of the plunger enters the case (and that the rod is substantially translationally fixed during operation of the fastener), any translation guidance can only be established no earlier than the case proximal end when the rod is being translated into the case. Therefore, consideration may be given to the potential that the plunger axis will fail to remain coaxial with that of the rod (hereinafter a "canted" relationship). It then becomes desirable in certain invention embodiments to incorporate splines or similar meshing engagements between the plunger and the rod and/or case.

These alignment means for facilitating proper stroke orientation may be formed on any element that directly contacts the plunger. Thus, the plunger outer surface may comprise lands and/or grooves that interact with functionally complementary structure formed on the inner surface of the case or with a bushing linked to the case through which the plunger passes. Similarly, the plunger inner surface may comprise lands and/or grooves that interact with functionally complementary structure formed on the outer surface of the rod. Additionally, sectional faces that define a plurality of fingers of the plunger may interact with lands formed in the case inner surface or with a web element present, as in one series of invention embodiments, at the proximal end of the case. Of course, the most simple form of alignment means is a close fit relationship between a smooth cylindrical rod outer surface and a smooth cylindrical plunger inner surface in at least one portion of the plunger and/or rod. The skilled practitioner will of course appreciate that a myriad of combinations of the above concepts is possible, and that such permutations are considered within the parameters of the present invention.

For purposes of this patent, the terms "area", "boundary", "part", "portion", "surface", "zone", and their synonyms, equivalents and plural forms, as may be used herein and by way of example, are intended to provide descriptive references or landmarks with respect to the article and/or process being described. These and similar or equivalent terms are not intended, nor should be inferred, to delimit or define per se elements of the referenced article and/or process, unless specifically stated as such or facially clear from the several drawings and/or the context in which the term(s) is/are used.

BRIEF DESCRIPTION OF THE DRAWINGS

FIG. 1 is an elevation view of a first fastener embodiment according to the invention with a case there for shown in phantom wherein the fastener is shown in a nominal state;

FIG. 2 is an elevation view of the embodiment of FIG. 1 but wherein the fastener is shown in a partially activated state;

FIG. 3 is an elevation view of the embodiment of FIG. 1 but wherein the fastener is shown in a fully activated state;

FIG. 4 is an exploded parts elevation view of the fastener of FIG. 1;

FIG. 5 is an elevation view of the fastener of FIG. 1, shown rotated approximately 90°;

FIG. 6 is a detailed cross section view of the proximal end of the fastener of FIG. 5;

FIG. 7 is an exploded parts perspective view of the proximal end of the fastener of FIG. 5;

FIG. 8b is an alternative view of the embodiment of FIG. 8a;

FIG. 9b is an alternative view of the embodiment of FIG. 9a;

FIG. 11 is an elevation view of the first fastener embodiment inserted into the aligned holes of two work pieces wherein the plunger has been depressed to cause the collet body distal end to translate past the distal end of the rod;

FIG. 12 shows the embodiment of FIG. 11 in a clamped up state, after release of the plunger;

FIG. 13 is an exploded perspective view of an second embodiment of a fastener according to the invention.

DESCRIPTION OF INVENTION EMBODIMENTS

Figure 8A:
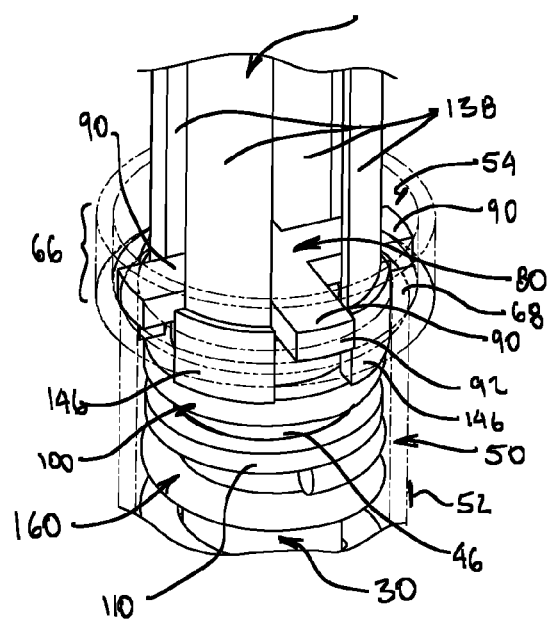
FIG. 8a shows the embodiment of FIG. 7 in a partially assembled state, particularly highlighting the translational meshing of the plunger fingers in the web openings.
Figure 8B:
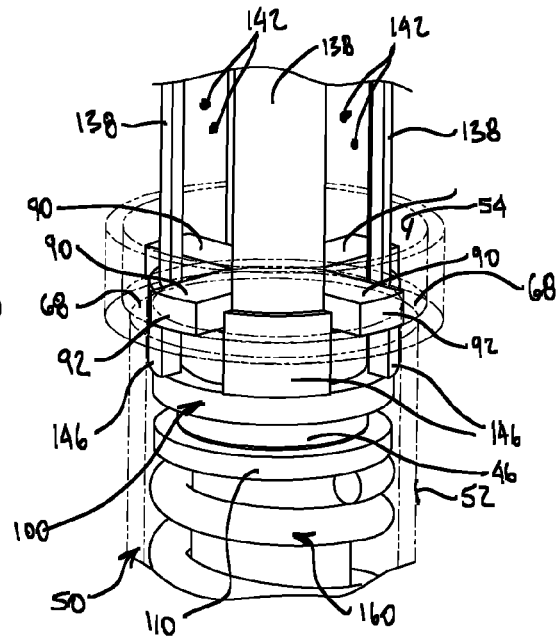

Preface: The terminal end of any numeric lead line in the several drawings, when associated with any structure or process, reference or landmark described in this section, is intended to representatively identify and associate such structure or process, reference or landmark with respect to the written description of such object or process. It is not intended, nor should be inferred, to delimit or define per se boundaries of the referenced object or process, unless specifically stated as such or facially clear from the drawings and the context in which the term(s) is/are used. Unless specifically stated as such or facially clear from the several drawings and the context in which the term(s) is/are used, all words and visual aids should be given their common commercial and/or scientific meaning consistent with the context of the disclosure herein.

With the foregoing in mind, the following description is presented to enable a person skilled in the art to make and use the claimed invention. Various modifications to the described embodiments will be readily apparent to those skilled in the art, and the generic principles disclosed herein may be applied to other embodiments and applications thereof without departing from the spirit and scope of the present invention, as defined by the appended claims. Thus, the claimed invention is not intended to nor should be limited to the disclosed and/or described embodiments, but is to be accorded the widest scope consistent with the principles and features disclosed herein.

Turning then to the several embodiments, wherein like numerals indicate like parts, and more particularly to FIGS. 1-4, a first fastener embodiment 20 shown. With particular attention for the moment to FIG. 4, fastener 20 comprises the following primary elements: collet body 30, case 50, rod 70, bushing 100, plunger 130 and locking ring 120. Returning then to FIGS. 1-3, it can be seen that collet body 30 includes outer surface 32 (and by implication, an inner surface), distal end 36 and proximal end 44. At a distal portion of collet body 30 are a plurality of fingers 38 defined largely by slots 42. Fingers 38 further include gripping elements 40, which include an acute leading face or chamfer as well as a trailing face for reacting against a distal work piece, as is best shown in FIGS. 11 and 12.

Collet body 30 partially surrounds rod 70, and includes outer surface 72, distal end 74, which includes chamfer 76 to facilitate radial expansion or contraction of fingers 38 during translation of collet body distal end 36 there past, and second end 78. As will be described in greater detail below, proximal end 78 engages with case 50 to provide a means for mitigating or preventing axial movement of rod 70 relative to case 50.

Surrounding both a majority of collet body 30 and rod 70 when fastener 20 is in the nominal state shown in FIG. 1 is a bias means in the form of spring 160, and surrounding all these elements is case 50. Case 50 includes outer surface 52 and inner surface 54. It is bounded by distal end 58 and proximal end 64, between which is body portion 56. Distal end 58 includes return or lip portion 60, which creates a reduced inner surface diameter orifice there at. This return or lip portion has inner seat 62a, which receives distal end 162 of spring 160, and has outer abutment surface 62b for reacting against a proximal work piece, as is best shown in FIGS. 11 and 12. Proximal end 64 of case 50 includes enlarged portion 66 defining web element seat 68, which is best illustrated in FIGS. 6 and 7.

The last major element of fastener 20 is plunger 130. Plunger 130, which is preferably constructed from a polymeric material has outer surface 132 and inner surface 134 as well as distal end 136 axially or longitudinally opposite proximal end 150. In addition to reduced cost, a polymeric material will usually possess a certain amount of resiliency, which beneficially extends tool life: lateral impacts or the like on plunger 130 will not cause permanent deformation and consequential loss of functionality. While proximal end 150 includes head 152, which may be formed as required by use considerations, distal end 136 requires consideration of its interface with web element 80 discussed below. Regardless of the precise nature of web element 80, distal end 136 comprises a plurality if distal ends of fingers 138, which are defined by slots 142 formed in body portion 144. Each slot 142 is bounded by sectional faces 140, which as will be described below, cooperate with sectional faces of the web element to facilitate proper alignment of plunger 130 therein. Additionally, distal end 136 comprises annular ring segments 146 that include distal face 148a for compressively contacting bushing 100 and proximal face 148b for compressively contacting locking ring 120 (see FIG. 7).

Also shown in FIGS. 1-4 is optional bushing 100. This element functions as an alignment component providing a suitable seat for annular ring 46 of collet body proximal end 44 at distal facing surface 104 (see FIG. 6), and a suitable seat for distal surfaces 148a of fingers 138 at proximal facing surface 106 (see FIG. 7). Peripheral surface 108a provides additional location support for plunger 120 and rod 70 as it translates along rod 70 towards distal end 58 of case 50, while peripheral surface 108b provides location support for fingers 138 at distal end 136 of plunger 130.

Figure 9A:
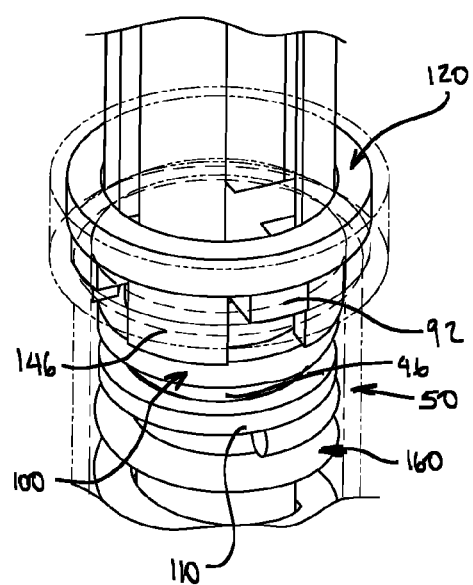
FIG. 9a shows the embodiment of FIG. 8a in a fully assembled state.
Figure 9B:
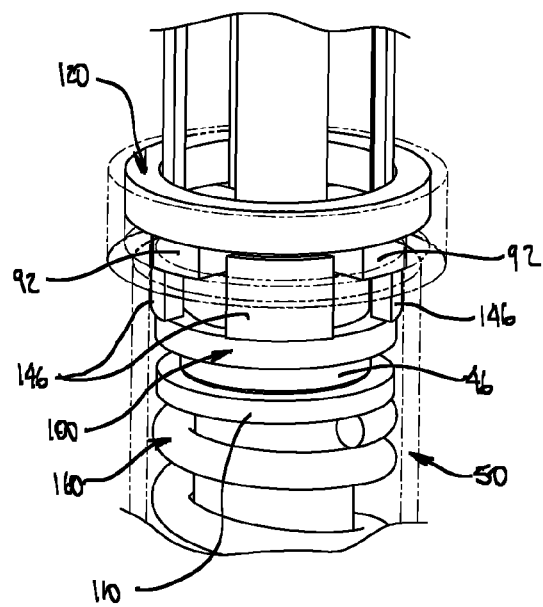
Figure 10A:
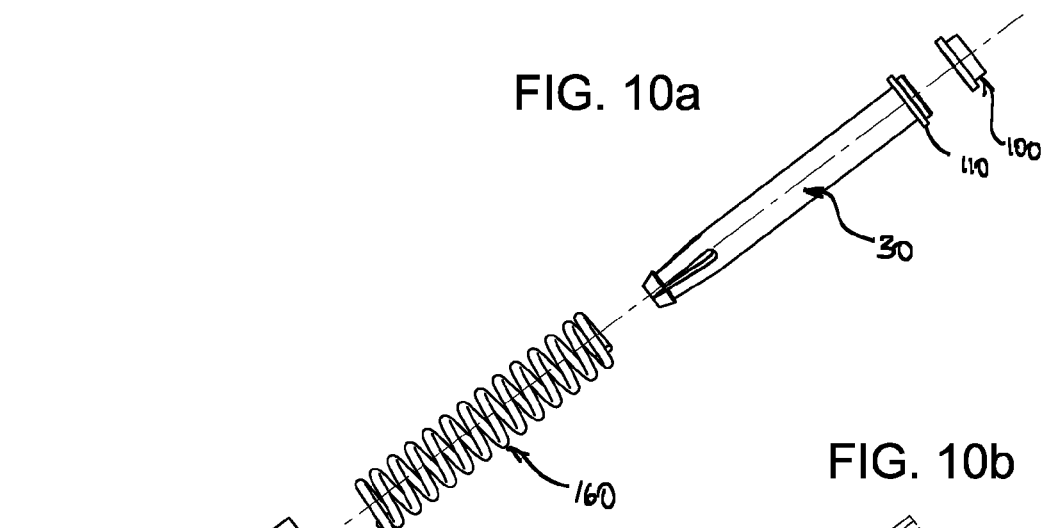
FIGS. 10a-f sequentially show the assembly of the first fastener embodiment.
Figure 10B:
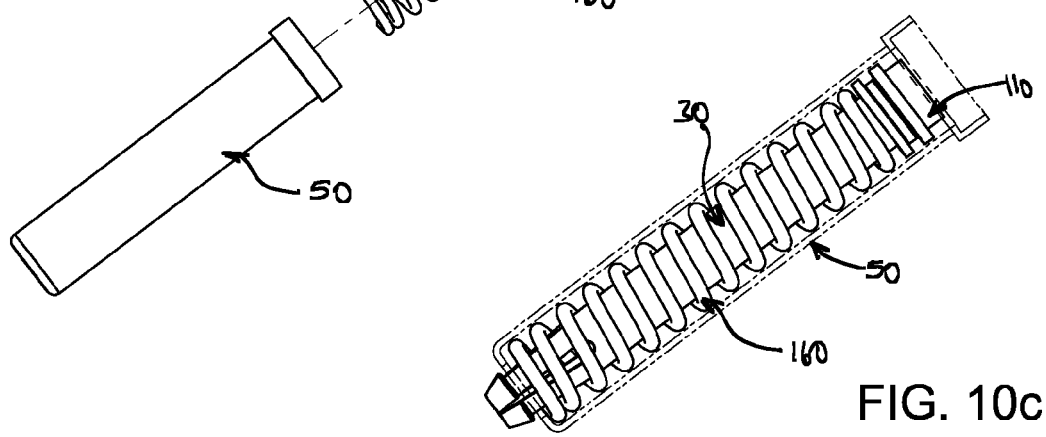
Figure 10C:
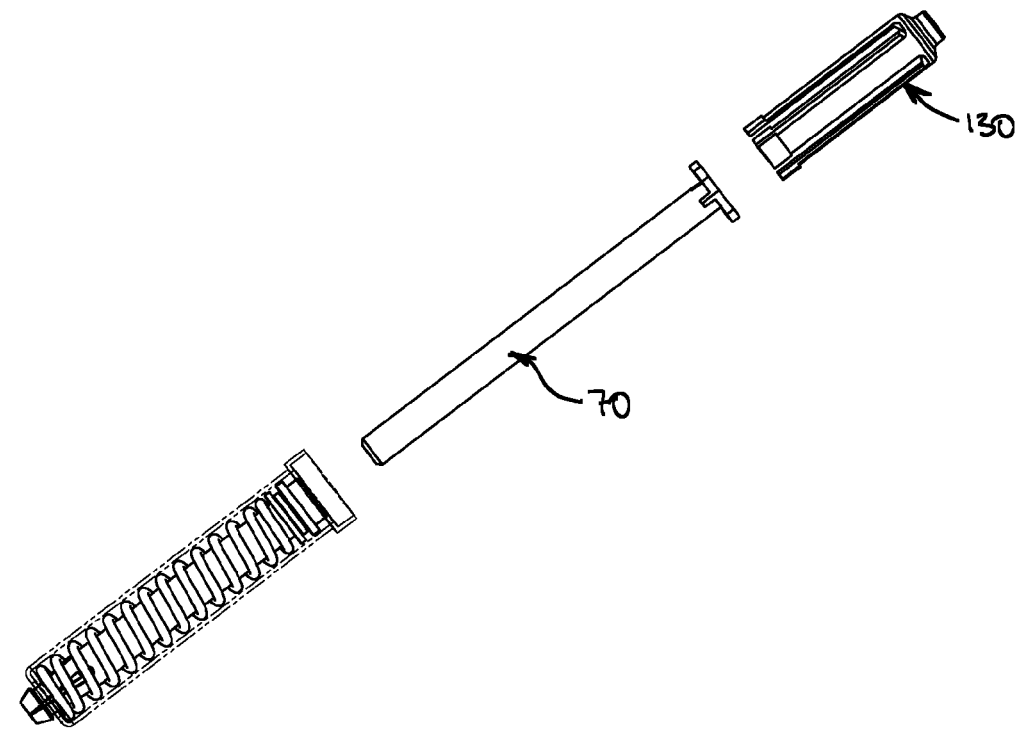
Figure 10D:
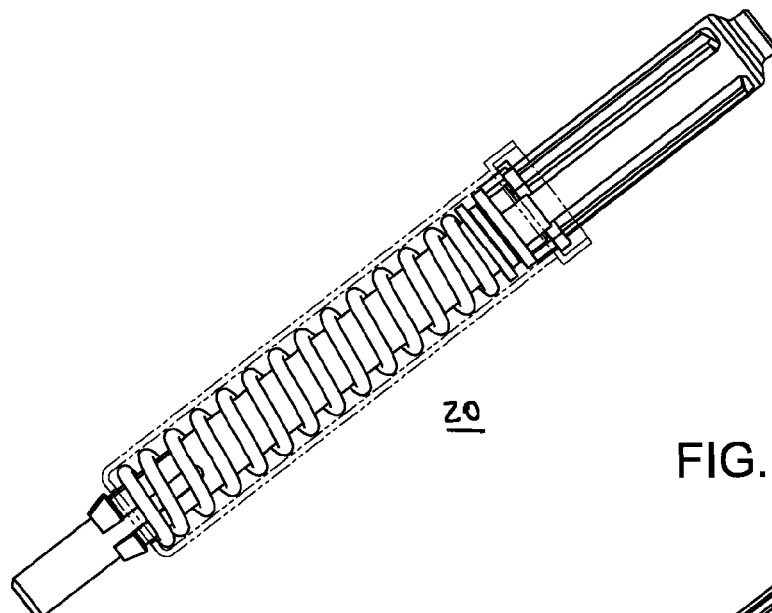
Figure 10E:
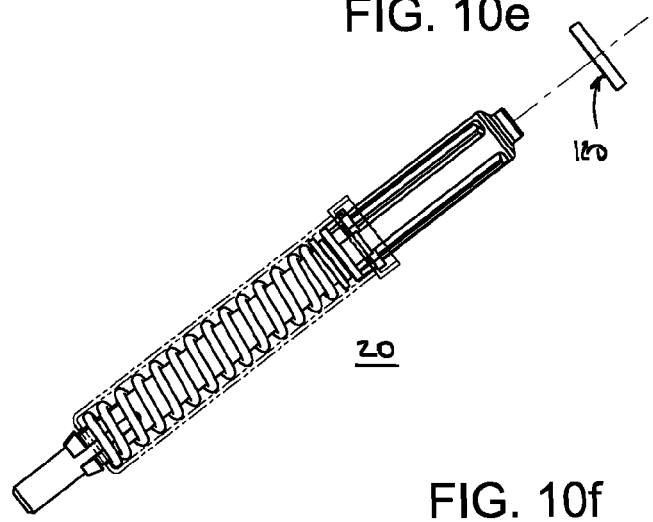
Figure 10F:
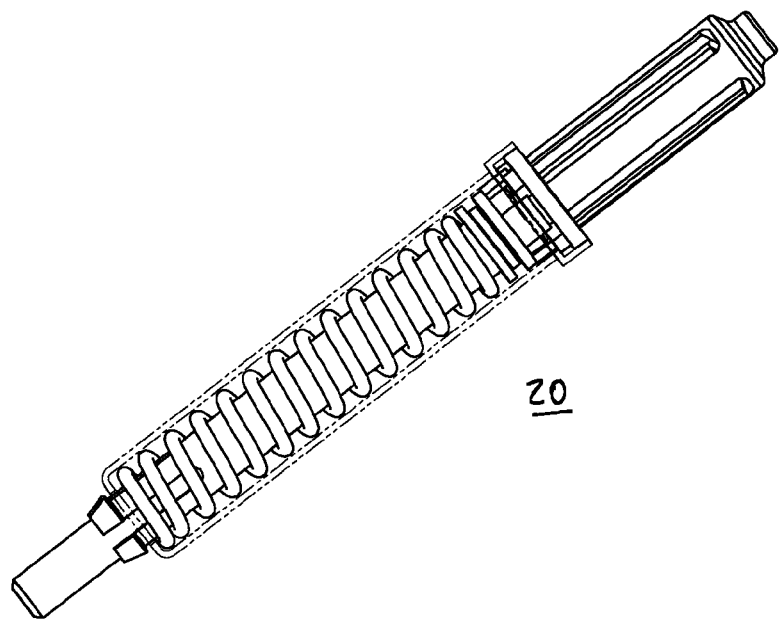
Figure 14A:
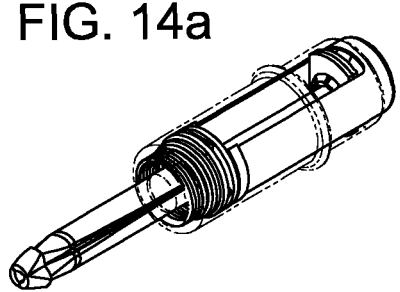
FIGS. 14a-f are various perspective views of the embodiment of FIG. 13 in nominal, partially active and fully active states.
Figure 14B:
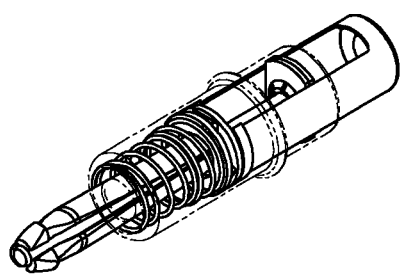
Figure 14C:
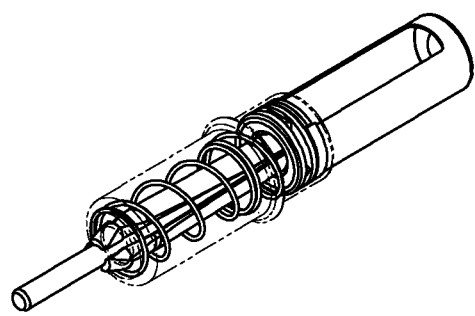
Figure 14D:
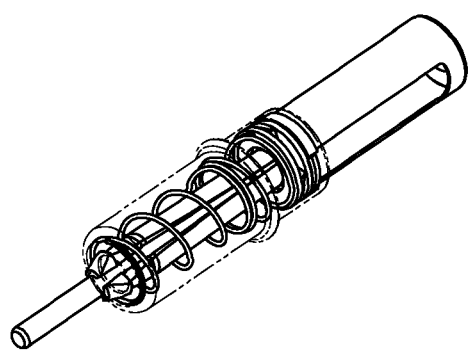
Figure 14E:
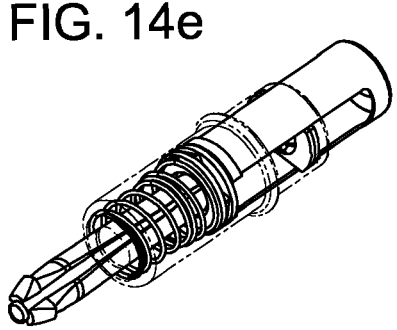
Figure 14F:
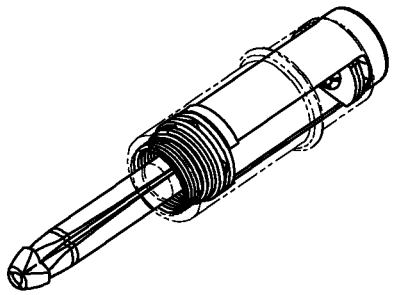

Turning specifically to FIGS. 7-9b, it can be seen that fingers 138 are sized to fit within the openings formed by arms 90 (which form web element 80) and limited by inner surface 54 of expanded portion 66. To prevent the unintended removal the fingers (or of web element 80) from expanded portion 66, locking ring 120, which may have barbs or buttress threads formed on an outer peripheral surface thereof, is inserted after inclusion of plunger 130 into fastener 20. As best shown in FIGS. 9a and 9b, once seated, locking ring 120 obstructively contacts proximal surfaces 148b of annular ring segments 146 as well as proximal facing surface 84 of web element 80, thereby retaining both within the confines of case 50.

FIGS. 10a-f illustrate a method of assembling fastener 20, while FIGS. 11 and 12 illustrate a method of compressively associating two work pieces using a fastener according to the invention. Finally, FIGS. 13 and 14a-f illustrate an alternative embodiment of a fastener according to the invention.

What is claimed:

1. A biased blind side fastener for associating at least two work pieces, each of which defines a hole through which at least a distal portion of the fastener may pass, the fastener comprising:
    a collet body having an outer surface defining an outer diameter, an inner surface defining an inner diameter, a distal portion having a distal end defining a first opening and a proximal portion having a proximal end defining a second opening, wherein the distal portion comprises a plurality of radially inwardly biased flexible fingers, distal portions of which constitute the collet body distal end and at least partially define the first opening, and further comprise gripping portions extending radially from the outer surface thereof;
    a generally cylindrical case having an outer surface defining an outer diameter, an inner surface defining an inner diameter of sufficient dimension to accept the collet body, a distal portion including a distal end defining a first opening and a proximal portion including a proximal end defining a second opening, the two ends being separated by a body portion, wherein the distal end has a reduced inner diameter portion and a work piece contacting portion;
    a rod having an outer surface defining an outer diameter at least a portion of which is dimensioned to permit translation of the collet body there along, a distal end and a proximal end, the two ends being separated by a body portion;
    a plunger having an outer surface defining an outer diameter, an inner surface defining an inner diameter, a distal end defining a first opening and a proximal end comprising a head portion, wherein a distal portion comprises a plurality of fingers, distal portions of which at least partially define the first opening and lateral sectional faces of which define a plurality of slots;
    a web element formed on the proximal end of the rod and coupled through a locking ring to the proximal end of the generally cylindrical case, the web element having an enlarged portion forming a lip upon which the locking ring rests peripherally linking an internally disposed portion of the rod to the inner surface of the case at the proximal end thereof, and defining a plurality of openings at least a number of which correspond to the plunger fingers to permit at least partial translation of the plunger fingers through the plurality of openings; and
    bias means sized to reside within the case for resisting translation of the collet body relative to the case and at a first end engaging the distal end of the case by resting against the reduced diameter portion of the case, and at a second end by engaging a lip on the proximal end of the collet body,
    wherein in an assembled state the rod and the case remain in fixed relationship to each other and, the collet body is translatable along at least a portion of the rod distal of the web element and the distal end of the plunger is between the web element and the proximal end of the collet body, and whereby translation of the plunger towards the distal end of the case causes the plunger fingers to contact and push against the lip on the proximal end of the collet body, overcoming the bias means and causing translation of the collet body proximal end towards the distal end of the case, where after the collet body fingers can radially converge as the collet body is pushed off the rod, with the rod no longer forcing the collet body fingers outward, and whereby when the plunger is depressed the fastener may be inserted in a hole of a work piece, with the plunger then released causing the rod to force apart the collet body fingers as the collet body fingers engage the work piece.

2. The fastener of claim 1 wherein at least one of the collet body or the bias means is axially restrained by the reduced diameter portion of the case.

3. The fastener of claim 2 wherein the reduced diameter portion of the case comprises an inner seat for receiving the first end of the bias means.

4. The fastener of claim 1 wherein at least one plunger finger comprises a shoulder portion or proximal face, and separation of the plunger fingers from the case is prevented by the locking ring, sized to abut the at least one shoulder portion or proximal face.

5. The fastener of claim 1 wherein axial motion of the web element and the plunger fingers are restrained by the locking ring.

6. The fastener of claim 5 wherein substantially all axial motion of the web element is restrained by the locking ring and by the reduced diameter portion of the case at the distal end thereof.

7. The fastener of claim 1 wherein the rod and the web element form a functionally unitary element.

8. The fastener of claim 1 wherein an arm surface of a plurality of arm surfaces defining the web element openings are in sliding contact with the plunger finger lateral sectional faces during operation of the fastener.

9. The fastener of claim 1 further comprising a bushing sized to axially receive the rod wherein the inner surface of the plunger is proximate to or in contact with the bushing and the outer surface of the plunger is proximate to or in contact with the inner surface of the case when the fastener is in an assembled state.

10. The fastener of claim 9 wherein the bushing comprises a plunger contacting portion and a collet body contacting portion.

11. The fastener of claim 1 wherein the rod and the web element form a functionally unitary element, wherein axial motion of the web element and the plunger fingers are restrained by the locking ring, and wherein the fastener further comprises a bushing sized to axially receive the rod wherein the inner surface of the plunger is proximate to or in contact with the bushing and the outer surface of the plunger is proximate to or in contact with the inner surface of the case when the fastener is in an assembled state.

\* \* \* \* \*